(12) United States Patent  
Slatter (10) Patent No.: US 6,904,183 B2  
(45) Date of Patent: Jun. 7, 2005

(54) IMAGE CAPTURE SYSTEMS (75) Inventor: David Neil Slatter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 631 days.

(21) Appl. No.: 09/784,503

(22) Filed: Feb. 15, 2001

(65) Prior Publication Data

US 2001/0019636 A1 Sep. 6, 2001

(30) Foreign Application Priority Data

Mar. 3, 2000 (GB) .............................................. 0005027

(51) Int. Cl.⁷ ............................ G06K 9/36; G06K 9/32; H04N 1/387
(52) U.S. Cl. ....................... 382/284; 382/294; 358/450
(58) Field of Search ................................ 382/318, 312, 382/313, 321, 284, 294; 358/450, 540

(56) References Cited

U.S. PATENT DOCUMENTS

| | | | |
|---|---|---|---|
| 5,515,181 A | 5/1996 | Iyoda et al. | 358/474 |
| 5,675,672 A | 10/1997 | Nakabayashi | 382/318 |

FOREIGN PATENT DOCUMENTS

| | | |
|---|---|---|
| EP | 0 591 974 A2 | 4/1994 |
| EP | 0 598 408 A2 | 5/1994 |
| WO | WO 00/67195 | 11/2000 |

Primary Examiner—Bhavesh M. Mehta  
Assistant Examiner—Duy M. Dang (57) ABSTRACT

An electronic image capture apparatus is disclosed comprising: an electronic camera having a detector, a lens having a field of view which is adapted to limit the radiation incident upon the detector to that within the field of view, an actuator for moving the field of view across the document, a control means for controlling the actuator to move the camera across the document so as to obtain a set of overlapping sub-images corresponding to different areas of the document, and electronic processing means adapted to receive the set of sub-images produced by the camera and to process the sub-images to form a composite image of the portion of the document covered by the set of sub-images. A set of processable sub-image files are produced which each comprise a data set of characters corresponding to characters appearing in a respective sub-image in the set and the relative location of the characters in that sub-image. The contents of each of the processable sub-image files are stitched into a blank text document by applying logical operators to the data in the files to produce a complete composite text document containing data indicative of the textual content of the scanned document.

13 Claims, 7 Drawing Sheets

IMAGE CAPTURE SYSTEMS

CROSS REFERENCE TO RELATED APPLICATIONS

This application claims the benefit and priority of U.K. application number 0005027.8, filed on Mar. 3, 2000.

BACKGROUND

This invention relates to improvements in image capture systems and in particular but not exclusively to an improved apparatus for capturing an image of a document using an electronic camera in a platenless document imaging system as a composite image formed from a mosaic of overlapping sub-images captured by the camera (known as tiling).

With increases in computer memory it is becoming increasingly desirable to capture images of documents and store them electronically in the memory. This is commonly performed using a device known as a scanner. Although these are effective and are now relatively inexpensive, flatbed or platen-based scanners occupy a large amount of deskspace. They are also difficult to use as the document to be scanned must be placed on the platen face down.

A solution to this problem has been proposed whereby a camera or other imaging device takes a photograph of the document consisting of text and/or images. This removes the need for the platen and so can be used to free valuable deskspace. It also allows the content of the document to be observed during capture as it is used face-up. An electronic camera would need to have a detector with about 40 million pixels in order to image an A4 document at the same resolution as a platen-based scanner, typically achieving a resolution of 24 dots/mm (600 dpi). Such a high-resolution detector is costly at present.

To eliminate the need for such a large high resolution detector array it has been proposed to use a smaller detector and to scan the field of view across the document to be imaged. A number of sub-images (or tiles) are taken during the scan which are subsequently patched, joined or stitched together to form a complete image of the document. A lower resolution camera can therefore be used whilst still resulting in a final image that has the same resolution as would be achieved from a single larger camera. See for example U.S. Pat. No. 5,515,181.

Whilst this approach is superficially attractive it does have several problems. An image from an inexpensive camera will have some image distortion, particularly towards the edges of the field of view. The distortion is therefore strongest in the overlap region between tiles, which makes it more difficult to achieve a good overlap simply by matching features. As a result, it may be necessary to match several features over the extent of the overlap area to get a good fit between adjacent tiles. If the camera is held translationally still relative to the document being tiled and moved angularly to direct its field of view to different tiles there will also be a degree of geometric distortion in the size and shape of the tiles on the document.

In order to seamlessly stitch together the sub-images (tiles) to form a single image it is necessary to identify the relative location of each sub-image and correct for any perspective dislocation caused by viewing the document at an angle. Ideally the region of the documents being tiled and its boundaries is known exactly for each sub-image taken (from a knowledge of the position and orientation of the camera). This allows the pixels of each of the sub-images to be linearly mapped onto an orthogonal x-y co-ordinate frame defined with reference to the plane of the document. The sub-image pixels that share co-ordinates can then be overlaid or blended. This is not in practice possible. Backlash and perhaps hysteresis in the mechanism which moves the camera will cause uncertainty in the alignment of the tiled images. Distortion of the sub-images due to imperfections in the lenses, or simply deformation of the document during the process, means that the edges of each sub-image will not map directly onto the edges of adjacent sub-images without problems, and often will not be accurately aligned relative to each other.

Commercially viable systems can at present locate characters in adjacent sub-images to within 10 pixels at a resolution of 12 pixels/mm over an A4 document. Although this is quite accurate, the resulting dislocations in characters near the boundaries of sub-images can be sufficient to produce unacceptably high errors in subsequent optical character recognition.

As it is impractical to produce a low cost actuator which will move the camera so precisely as to take images with no overlap it is usual to deliberately overlap the sub-images. The amount of overlap depends on the degree of error expected in the camera orientation/position control. This overlap can be used to advantage in stitching together adjacent sub-images by identifying image features on the document that are present within the overlap region of a sub-image and also the overlap region of the adjacent sub-image.

This feature matching approach at pixel level has several disadvantages. Firstly, the matching of image characteristics is computationally intensive. Indeed, compared with the speed at which the sub-image tiles can be captured and then downloaded from the camera this processing may be the limiting factor on the throughput of the system. Secondly, distortion of the field of view of the camera lens may result in small features in one sub-image being unmatched to the same feature in an adjacent sub-image due to stretching or compression of the artefact, due perhaps to the geometry of the system for adjacent field of view tiles, which may fool the computational methods used. Many documents have significant areas of blank space, for which it is not possible to match features. This necessitates the use of larger overlap areas to increase the likelihood that there will be suitable matching features in the overlap areas, with the result that more images must be captured. It is also possible that features will be incorrectly matched, particularly for text based documents in which common letters repeat frequently.

As a result of problems such as these, scanning camera-based document imaging systems cannot yet compete with flatbed or platen-based document scanning systems.

A solution to the problem of image distortion is discussed in the applicants earlier patent application EP99308537.2 filed on 28 Oct. 1999. This discloses a technique for mapping sub-image data at pixel level onto a co-ordinate frame relative to the document which compensates for distortion in the sub-images by generating transform data. It is envisaged that the disclosure of this earlier dated patent application may be used in combination with the teachings of the present application.

BRIEF SUMMARY

It is an object of this invention to provide an image capturing system using a scanning, or tiling, electronic detector that ameliorates, at least partially, some of the problems of the prior art.

In accordance with a first aspect the invention provides an electronic image capture apparatus comprising: an image detecting device adapted to capture a set of sub-images or tiles corresponding to different areas of a document at known locations and electronic processing means adapted to receive the set of sub-images produced by the device and to process the sub-images to form a machine-readable text document equivalent to the portion of the document covered by the set of sub-images; characterised in that;

i) the processing means includes an optical character recognition subroutine which is adapted to produce a first set of processable data files which each comprise a data set of characters corresponding to characters appearing in a respective sub-image in the set and the relative location of the characters in that sub-image; and ii) the processing means is adapted to stitch together the characters stored in the data files to produce a machine readable text document.

The invention therefore provides that the sub-images are first passed through an optical character recognition (OCR) sub-routine prior to stitching. The stitching is performed at a character level rather than a pixel or sub-pixel level.

It is noted that U.S. Pat. No. 5,675,672 discloses a hand-held scanner which takes randomly spaced images of adjacent regions of a document under the manual control of the user and which seeks to avoid duplication of text which may have been scanned in twice by performing an OCR operation on the images and overlaps matched recognised OCR characters and deletes the duplications to create a seamless word-processable text file. It looks for matches at the "vertical" edges of scanned blocks as well as at "horizontal" ends of lines. It does not know which scanned region is next to which other scanned region on the document, nor which parts of which two scanned regions overlap before it starts matching the OCR'd regions. It has scanned regions of variable sizes and irregular shapes that do not correspond to known locations.

Because the sub-images in the present invention are processed to convert the data in the image into a processable data file comprising a processable set of character data before stitching, a machine readable document or text file is created without the need to use high quality optics. The sub-images may be processed by the OCR subroutine individually in sequence, or all at the same time using parallel processing. It is preferred that each sub-image is processed during the interval between the capture of one sub-image and the capture of the subsequent sub-image by the camera.

It is envisaged that the present invention is particularly suited for use in a technique which embodies the teachings of our earlier patent application EP99308537.2. This can be used to generate transform data which allows the location of the characters within each sub-image to be accurately located relative to the document and the adjacent sub-images.

The image detecting device may comprise at least one electronic camera having a detector, a lens having a field of view which is adapted to limit the radiation incident upon the detector to that within the field of view, an actuator for moving the field of view of the camera relative to the document to be imaged, and a controller for controlling the actuator to move the field of view of the camera across the document so as to obtain the set of sub-images or tiles.

Thus, the image detecting device comprises a camera which may be moved through both a pan and a tilt direction to cover the document and obtain the sub-images. Of course, it could alternately translate in a plane parallel with that of the document if preferred. The document may therefore be moved relative to the document or vice versa.

In another alternative, the image detecting device may comprise a plurality of detectors which each obtain a respective sub-image by viewing a selected area of the document. The detectors may be arranged in a grid in a single package, such as a credit card sized grid of small detectors. The sub-images could then be obtained simultaneously or in a sequence. A 36 detector grid may be used, or perhaps less detectors (i.e. 9 or 16).

In a still further alternative, the detector may comprise a detector having a lens which limits the field of view of the detector to an area of the document having the size of a sub-image, the document being moved past the detector by the user and the detector capturing sub-images when the document has moved to a location where a sub-image is required. Thus, the detector may image a strip across the document. As the document is drawn past the camera sub-images are obtained at the correct location by using knowledge of the position of the document relative to the detector.

Of course, other arrangements are envisaged in which a suitable set of sub-images from known locations on a document are obtained.

The data in the first set of processable data files may be stitched together to produce the machine readable document by mapping characters in the data files onto the corresponding locations or co-ordinates in a spatial template (or map) of the machine readable document. The template is in effect a blank document with which the characters are mapped. This is possible since the location of the sub-images relative to each other, and hence location within the text document, is stored in the processable data files. It is also possible because the relative location of the sub-images is known through control of the actuator and knowledge of camera imaging parameter (in particular focal length).

The processing means may establish a co-ordinate system which defines the template of the blank machine readable document. Any point in the imaged document can then be uniquely identified by its co-ordinate in the machine readable text document. Any shape or size of text document can be stored in this form as a set of characters corresponding to the characters on the document and a set of locations or co-ordinates identifying the location of the characters in the document.

A second co-ordinate system may be defined for each sub-image. The characters located in each sub-image after OCR may be stored in the processable data files along with their location in this second co-ordinate frame. Indeed, a separate co-ordinate system may be defined for each sub-image. The co-ordinate systems of the document and the sub-images may be the same in each case, or may be related to one another through some transform such as described (and incorporated herein by reference) in EP99308537.3. Thus, each character stored in a processable data file can be easily mapped onto the co-ordinate frame for the machine readable document. Indeed, the data in the data files may all be stored so that each character is identified by its location on a common co-ordinate system.

A number of possible co-ordinate systems are envisaged. The most preferred system would be one of orthogonal x-y co-ordinates.

The sub-images may correspond to areas of the document that abut one another, i.e. do not overlap. Alternatively, the sub-images may overlap. A mixture of overlapping and non-overlapping sub-images may be obtained from the camera. It is in fact preferred that the sub-images overlap at least by the width of the largest character which is expected in the document.

By overlapping in this manner it is possible to ensure that any character in the document is wholly contained within at least one of the sub-images. This ensures that it can be reliably identified by the optical character recognition sub-routine when applied to that sub-image.

The processing means may be adapted to stitch together the data in the processable data files to produce the machine readable text document by allocating the characters in the data files to the corresponding co-ordinates of the machine readable text document. This may be repeated until all the co-ordinates of the document either have a character or a space allocated to them.

Where only one data file contains a character at a given co-ordinate in the machine readable text document the processing means may be adapted to allocate that character to that co-ordinate. If none of the processable data files contain a character at that co-ordinate then a space is entered in the text document. The processing means may continue to allocate characters (or spaces) to the text document until the stitching is complete. The shared co-ordinate system ensures that characters are correctly allocated to the correct place in the machine readable document.

If the sub-images overlap then more than one processable data file may contain data corresponding to a character at a single location in the blank text document.

The processing means may be adapted to determine the reliability of the data in the processable data files and in the event that two or more data files contain different characters corresponding to the same location in the machine readable text file the processing means may be adapted to select which data to allocate based on the reliability of the data. The processing means may determine the reliability of the data by applying one or more logical rules to the data in the processable data files.

A number of suitable logical rules are envisaged. One rule may be to prefer that the character which is located furthest away from the edge of a sub-image is used to construct the machine readable document if there is a conflict. Typically, if a character is close to an edge then it may not have been correctly recognised during OCR due to distortion or if it lies only partially within the sub-image.

Of course many other logical rules are envisaged. For example, since the data in the sub-image files has already been processed by an optical character recognition sub-routine prior to the stitching process the ability to exploit grammatical rules can be used. This is not possible with the prior art system in which stitching occurs before OCR.

The OCR sub-routine may produce reliability data indicative of the reliability of each character it recognises in a sub-image. One logical rule may be to prefer to insert characters having the highest reliability as indicated by the OCR sub-routine.

The processing means may be adapted to identify lines of text within each processable data file from the spatial distribution of the characters identified for each sub-image. The characters of a line will all tend to be grouped together spatially in one axis about a co-ordinate frame. Any character which falls within a preset spatial distance along this axis from an identified line may be assumed to be part of that line.

Alternatively, the OCR subroutine may automatically produce line data at its output by grouping characters into lines. If, for example, this does not include y-co-ordinate data the characters allocated to each line may be grouped and the spatial distribution of the characters about the y-axis used to calculate the average line co-ordinate. This could be done on a line-by-line basis.

The data in the first set of processable data files may be stored as a number of strings of characters after they have been allocated to a line. The strings may be stored as intermediate processable data files. Thus, each intermediate file will comprise one or more strings of characters corresponding to a line of text in the respective sub-image.

The processing means may be adapted to stitch together the strings of text stored in the intermediate data files rather than work directly from the first processable data files. In this way, the processing means effectively constructs the machine readable text document by stitching together the strings of characters to form complete lines. As overlap only occurs at the ends, this can speed up the stitching process.

One way of using the information in the intermediate data files may be to identify which lines in the intermediate data files correspond to lines on other intermediate data files from the spatial distortion of the lines. In practice, as lines run generally horizontally across a document, it would be expected that the vertical (y) co-ordinates for the lines in the intermediate data files will be clustered. The average location of each cluster can be used to indicate the centre height of a complete line.

Having identified complete lines, the processing means may construct the complete machine readable text document by inserting characters to the correct co-ordinates by working across each line in return. Thus, as the vertical locations (Y co-ordinate) of the complete lines are known, only those co-ordinates where it is known there is a line need to be filled. The remainder can automatically be allocated with blanks or spaces.

The data in the processable data files may be in the form of ASCII characters or any other preferred character set which is capable of representing the textual content of the document.

In a further refinement, the apparatus may be adapted to capture a further sub-image located about an area of the document which contains unreliable data. The additional image may be processed using OCR to try to identify the character to allocate to the text document.

The sub-images produced by the camera most preferably form a grid of sub-images, of known size and shape and tile overlap that together cover the whole or part of a document. For convenience and to be compatible with the majority of commercially available detectors the sub-images may correspond to rectangular areas of the document surface. The grid may be a square grid, for example a 4 by 4 grid, or perhaps some other shape of grid, such as a rectangular grid of 6 by 4 sub-images. For an A4 document with a VGA detector then 30 sub-images has been found to produce acceptable results.

The sub-images may be obtained by sending instructions from the control means to the actuator to scan the field of view of the apparatus across the grid in any chosen pattern whereby the field of view crosses all the chosen sub-image locations.

It is simplest for the actuator to move the field of view across the document in a series of horizontal passes, with each pass being displaced vertically relative to the other passes. The camera may be held substantially stationary relative to the document in a transitional sense, and instead be moved angularly to scan the field of view over the document. The camera may be able to move angularly in two different directions. It may be mounted on pivots or gimbals.

The control means may instruct the actuator to pause the movement of the camera temporarily in order for a sub-image to be captured. This ensures that clear images are obtained without undue blurring. However, whether or not this is necessary will depend on the speed at which the camera is moved and the time taken to form a sub-image.

The lens assembly may be adjustable to enable the camera to take an overview image of the whole document area covered by the set of sub-images. The lens may comprise a single adjustable lens that can be operated to enlarge the field of view seen by the detector. It may comprise a zoom lens which in a first position provides the field of view for the overview image but can move to a second position in which the smaller field of view needed for the sub-images is provided. Alternatively it may comprise a number of lenses which are alternately positioned over a single detector.

In a still further alternative two detectors may be provided, each with a lens having a different field of view. The output of one lens may form the sub-images; those of the remaining lens the overview image. The processing means may be adapted to combine information in the overview image with the data in the processable sub-image files to produce alignment data. Although the overview image will have a lower resolution than that of the sub-images it can assist in identifying the location of lines of text in the document even if individual characters can not be reliably identified.

The apparatus may include one or more cables along which control signals may be supplied to the camera and the camera actuator. A cable for receiving the data corresponding to the captured sub-images from the camera may also be provided. These cables may connect the apparatus to microprocessor and memory in which instructions for a program for forming the composite images may be held. Alternatively a cable-less link such as an infrared link may be provided.

The camera may comprise a conventional digital camera, of which many different types are presently commercially available. It preferably comprises a charge coupled device (CCD) array which produces an output sub-image corresponding to the pattern of light incident upon the array from the document. The camera may be located on a support and the actuator may be adapted to move the camera relative to the support to scan the camera across a document. The actuator may include an electric motor such as a stepper motor.

Preferably, the sub-images are captured by the camera in a known sequence. These sub-images must be spaced in a known fixed relationship so that the characters in the data files can be correctly allocated to their locations in the machine readable document. Of course, slight misalignment can be tolerated by the invention.

It will also be appreciated that much of the processing, for instance to generate the data files using OCR and even to start the stitching operation, can take place whilst sub-images are being captured, or only after a full set has been captured.

In accordance with a second aspect the invention provides, in combination, a document carrying text comprising a combination of characters from a character set and an imaging apparatus according to the first aspect of the invention, and in which the apparatus is adapted to obtain sub-images which overlap spatially by a distance greater than the size of at least some of the characters on the document that are present in the region of spatial overlap.

If the document has characters of different sizes the overlap may be such as to be at least as wide as the majority of the characters, or at least as large as the largest expected character to be recognised. This system aims to ensure that at lease some individual characters in overlap regions are wholly contained within at least one sub-image for conversion by the character recognition sub-routine prior to stitching.

Providing a spacing greater than the largest expected character ensures that there is a reduced possibility of a character being missed from the conversion by falling only partially into a sub-image. At least one sub-image must wholly contain that character. The degree of the overlap may be at least as big as a character plus character-to-character spacing on the document. It may be two characters and one spacing wide, or more (two typical expected characters and one typical expected spacing).

According to another aspect the invention comprises a method of creating a machine readable text document in a memory comprising:

capturing an image of a document being scanned by capturing a plurality of sub-images or tiles which correspond to known regions of a document and which in combination cover the document being scanned;

performing an optical character recognition process on each sub-image or tile to create a plurality of text records with machine-readable coded representations of recognised characters; and joining the text records corresponding to the aligned sub-images tiles so as to create the machine readable text document.

It may be desired to match many tiles. Two adjacent tiles may be provided which overlap at their adjacent peripheral edge regions. At least one tile may be matched at more than one of its peripheral edge regions, possibly at substantially orthogonal edge regions and/or at edge regions that are generally parallel and spaced apart.

A tile, or rather the OCR'd text record comprising coded representations of recognisable characters, may be joined by comparing their data content at regions of expected overlap and not elsewhere. If it is known that no other tile will have data equivalent to the middle, for example, of a tile it may be a waste to try to match the middle position. Furthermore, if each tile has an overlap region then because the scanning is under machine control the controller will know which other tile is adjacent and will know to try to match/align the encoded data files representative of the two tiles. Furthermore, the controller will know which first edge overlap region of a first tile overlaps with a second edge overlap region of a second tile, and which parts of the OCR'd first and second text files for each of the first and second tiles correspond to the first and second overlap regions, and so the controller can run the matching process on the expected two parts of the first and second text files (possibly only on these expected two parts of the first and second files). If the overlap region is, say, 5% of the width/height of a tile, this may result in comparing 5% of the first text file with 5% of the second text file (in comparison with comparing the whole of each text file if the controller did not know that only the parts of the text files equivalent to the first and second overlap regions were worth matching). This can make the match process faster.

A matching operation may be operated on all sides of a tile or on all sides of all tiles. This may be simpler to programme/safer, and may assist in making a text document in memory that is larger than a single page being scanned (e.g. scanning several pages when the end of one page needs to be aligned with the top of the next).

The joining operation may comprise allocating characters in the text records corresponding to known regions of the document to a corresponding region of the machine readable text document. If more than one text record contains a character for the same region of the text document, as occurs at overlap areas, then logical rules may be applied to select which character to allocate to that region.

In accordance with a further aspect, the invention provides a computer readable medium having a program recorded therein in which the program causes, in use, a computer running the program to execute the method of the third aspect of the invention or produce an apparatus in accordance with the first aspect of the invention.

In accordance with a yet further aspect, the invention provides a software carrier carrying image processing software which when operational on a computer or network which is connected to a camera either provides the apparatus of the first aspect of the invention or operates a computer or network in accordance with the third aspect of the invention.

The invention may also comprise a piece of software or suite of software which when operational provides the method of the third aspect of the invention

BREIF DESCRIPTION OF THE DRAWINGS

There will now be described by way of example only an embodiment of the present invention with reference to the accompanying drawings of which.

DETAILED DESCRIPTION

Figure 1:
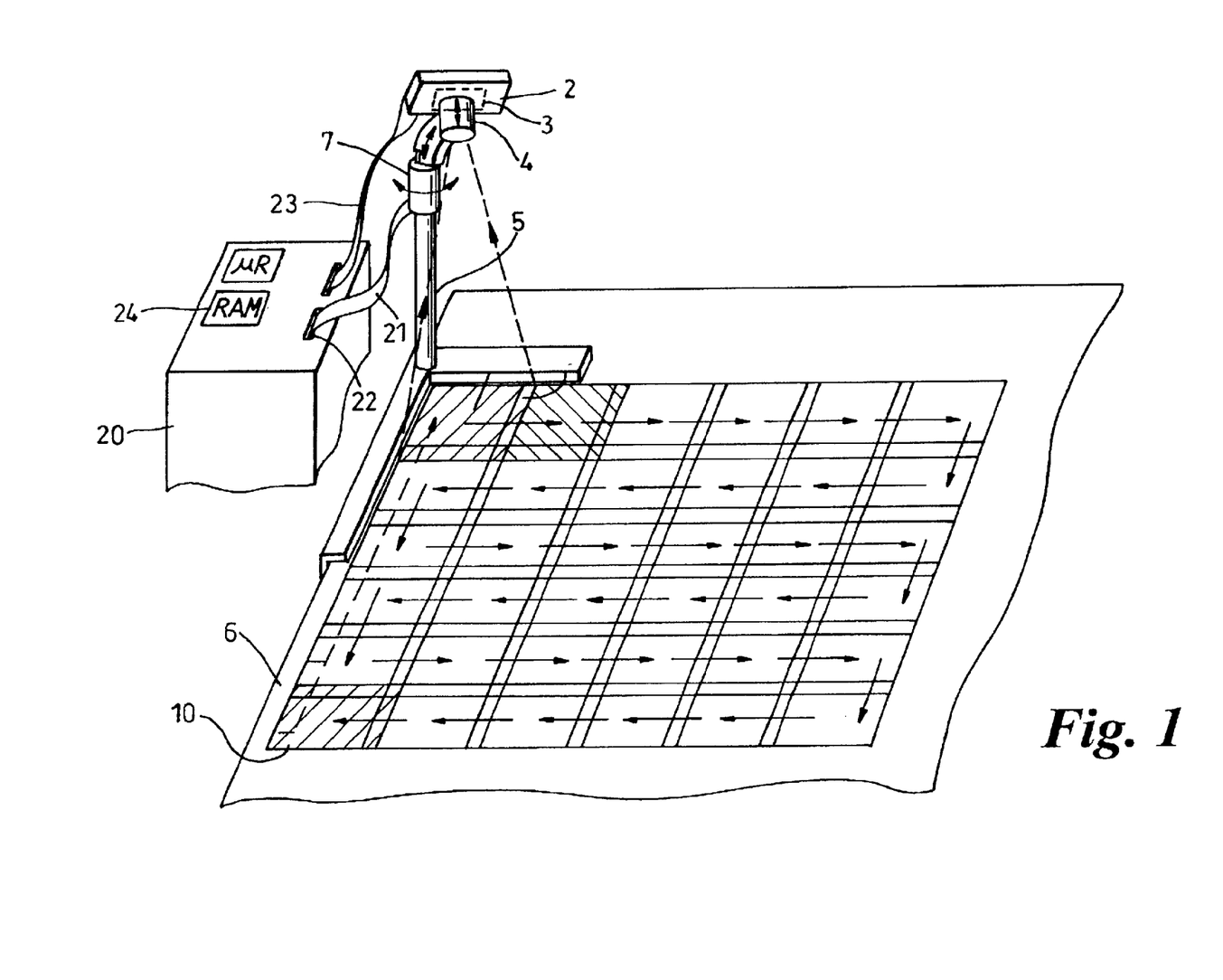
FIG. 1 is a schematic drawing of an image capturing apparatus in accordance with the present invention.

Referring to FIG. 1 of the accompanying drawings, an image capturing system for imaging a document 10, for example a document of A4 size carrying text characters, comprises a conventional electronic camera 2 having a charge coupled detector (CCD) array 3 having a resolution of 480 by 640 pixels. A lens 4 with an autofocus mechanism is mounted across the front of the array 3 to focus incident light onto the array 3. The lens 4 has a limited field of view and in use is focused onto the array 3 so that light from a predetermined area of the document is imaged onto the array at any one time. The field of view of the camera is shown in the drawing by cross hatching and shading.

The camera 2 is mounted to a stand 5 which supports the camera securely relative to a work surface 6 on which the document 10 to be scanned can be placed. Holding the camera approximately 30 cm from the surface has been found to produce good results. This work surface 6 may be part of a user's normal deskspace. As shown the stand 5 supports the camera 2 above the work surface at right angles to the surface and hence any document placed on the surface. The stand 5 may be movable/e.g. pivotally or removably mounted on the desk, and/or the camera 2 may be remounted/mounted on the stand.

Figure 2:
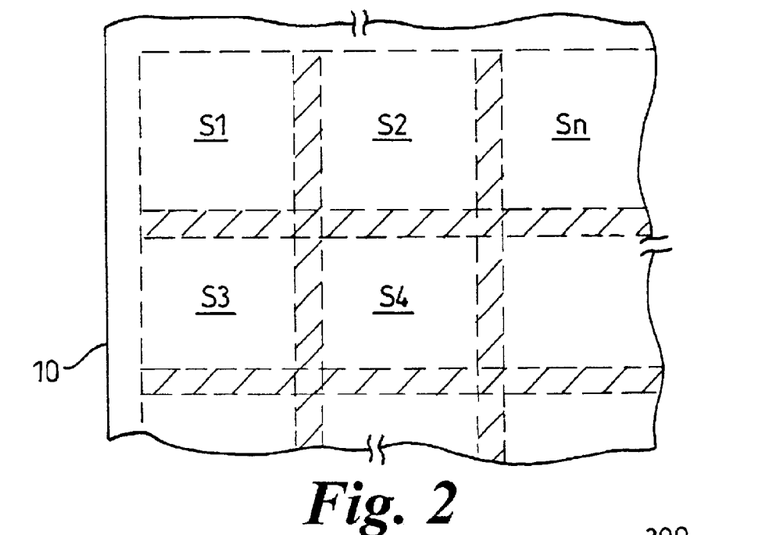
FIG. 2 is an overhead view of an A4 document showing the location of the areas on the document that fall within individual sub-images used to construct an image.

The camera 2 is attached to the support stand 5 through an electronically controlled actuator 7. In the example shown the actuator 7 comprises an electrical stepper motor of known construction. The camera 2 is moved under the control of the actuator 7 to scan across the document. As the camera 2 is scanned a number of sub-images are captured, each corresponding to the field of view of the camera lens. All the sub-images overlap at least one adjacent image and preferably form a grid of sub-images as shown in FIG. 2.

Control of the actuator 7 is achieved by supplying control signals from a suitable control unit through a cable to the actuator. The control unit may comprise a personal computer 20 which is connected to the actuator 7 along a ribbon cable 21 connected to an expansion card 22 within the personal computer.

The control unit instructs the actuator 7 to move the field of view of the camera 2 across the document in a pre-set pattern whenever a request for an image capture is made by the user. In order to move the camera in a suitable pattern to produce the sub-images located as shown in FIG. 2, the control unit initially moves the camera to point it at the upper left corner of the document. It then instructs the actuator to move the camera angularly to point to the right until it reaches the upper right corner of the document. After this horizontal scan has been completed the actuator returns the camera to the left hand side of the document (as shown) and moves the camera accurately down to point at a lower region of the document. The scan then repeats from left to right. Alternatively, it may step the field view down one row and scan both across the second row in the opposite direction of the direction of movement for the first row.

For the four by four grid of the figures the actuator moves the camera across the document in four passes. Each time the camera is pointed slightly lower down the document until the final scan moves the camera to point from the lower left corner of the document to the lower right hand corner. Of course, the camera may make more than four scans. This will depend on the resolution of the camera detector and the size of the document. It will ultimately affect the number of sub-images used to produce a full image.

The control unit is also connected, along a second ribbon cable, to the camera detector. This allows the control unit to supply instructions to the detector to obtain a set of sub-images during the camera scan process.

Figure 4:
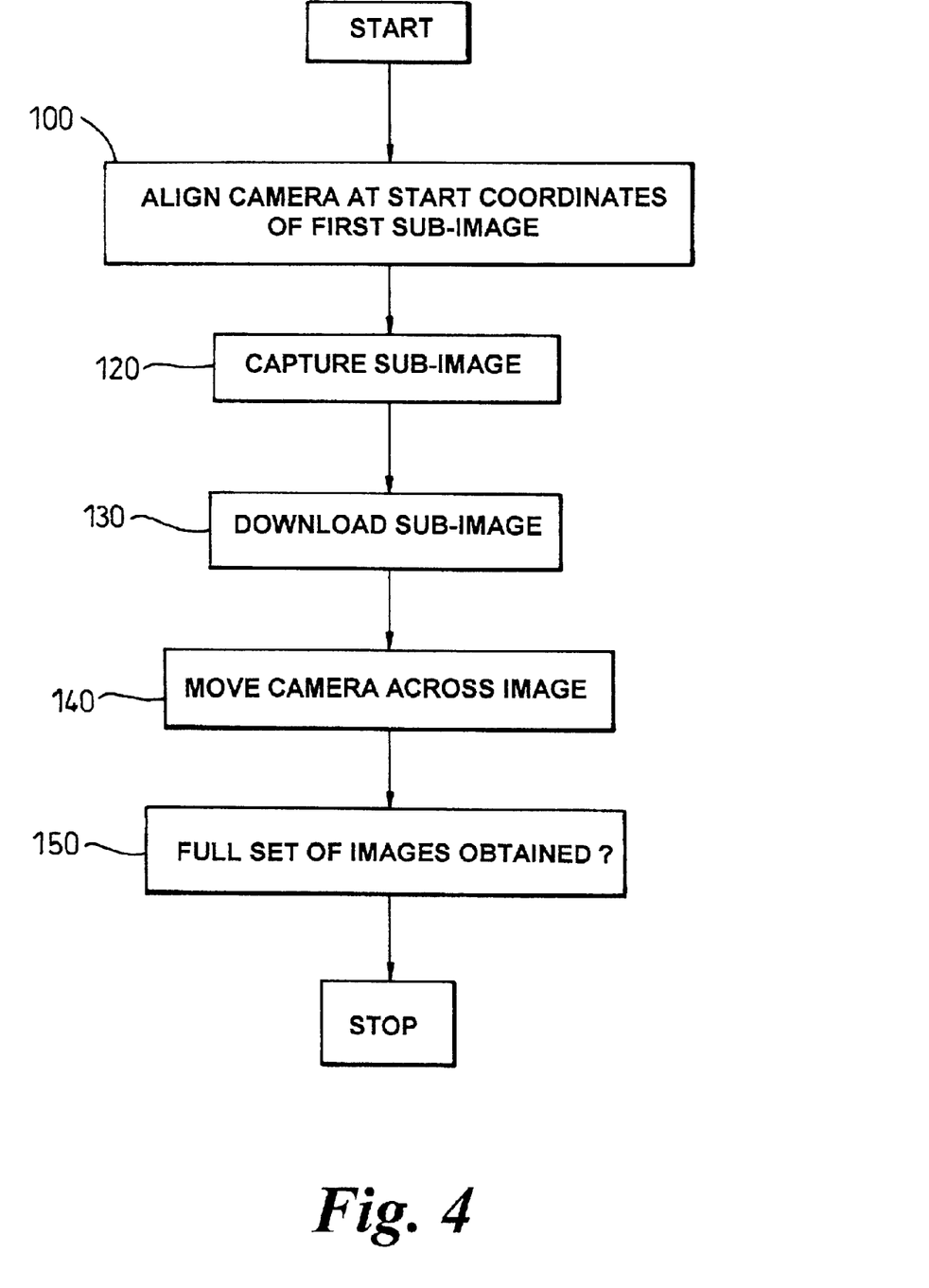
FIG. 4 is a flow chart of a process of capturing a set of sub-images using the apparatus of FIG. 1 in accordance with the present invention.

In a practical arrangement, the set of sub-images is captured using the processing steps illustrated in the flow chart shown in FIG. 4 of the accompanying drawings. Initially, the control means instructs 100 the camera to move to the area of the document corresponding to the location of the first sub-image. An image is then captured 120 and downloaded 130. The control means then moves 140 the camera to the next horizontal location and takes a further image. This continues until a full set of images has been captured 150.

For example, to capture a four by four grid of sub-images, four sub-images are obtained from each horizontal scan, until a set of 16 overlapping images are obtained. The control unit in practice instructs the camera to capture an image after the stepper motor controlling the camera 2 movement has moved through a number of steps. The control unit calculates in advance how many steps the motor must take to move across the document from the area of one sub-image to the next. By taking the sub-images in this manner in co-ordination with the scanning of the camera ensures that each sub-image corresponds to a known area of the document and that each sub-image has a known overlap portion which overlaps with another known overlap position of an adjacent, known, sub-image. In the embodiment shown, the camera is paused momentarily whilst the images are obtained, although it may be possible to take images without pausing the camera movement depending on the camera shutter time.

The control unit downloads the set of 16 sub-images from the camera 2 along the second ribbon cable 23. These are stored in a first area of electronic memory 24, which may be provided on the expansion card or may be part of the personal computers main memory storage.

The captured sub-images are processed by the personal computer to form a machine readable text document or file according to the process steps set illustrated in the flow chart of FIG. 4 of the accompanying drawings.

In a preliminary step the sub-images are transferred onto a co-ordinate frame which compensates for perspective distortion and other effects. This can be accomplished in accordance with the teachings of EP99308537.2

In a first step, once a sub-image has been downloaded to the first area of memory it is processed by an optical character recognition sub-routine 210. The function of this routine is to identify textual characters in the sub-image and convert the textual characters in that sub-image into a processable format with machine-readable equivalents of the recognised optical characters. These characters are stored as a first processable data file. In the example of capturing 16 images there will be stored 16 corresponding processable data files at the end of this process.

The optical character recognition sub-routine processes the contents of a sub-image so as to identify all text characters within the sub-image. The ASCII code for each character is stored along with the information describing the position of the boundary box for each character within the sub-image. The position of each boundary box can be stored as x-y position information with reference to a set of orthogonal x-y co-ordinate axes defined for the sub-image.

Of course, the order in which identification and location of each character and its boundary box location is made may vary depending on implementation requirements. For example, all the characters may first be identified before allocating a co-ordinate. It is most preferred however to simply scan the sub-image to locate and recognise characters by analysing each individually identifiable object.

After each sub-image has passed through the optical character recognition routine the memory will therefore contain a unique set of first processable data files encoding all the recognised characters within each sub-image with the code for each character and their relative location.

After initially identifying the characters and their location for every sub-image, and from this data constructing a set of first processable data files with one file corresponding to each sub-image the data in the files is next processed to identify individual lines of text within each sub-image and allocate characters to the identified lines.

In the present embodiment the result of the line identification process is a set of intermediate processable data files 240 comprising strings of characters and their location relative to their respective sub-images. One intermediate data file will be produced for each first processable data file (i.e. corresponding to each sub-image). Each identified line is stored as a string of ASCII-characters. Each string represents a horizontal line of text characters within the sub-image.

After identifying lines within each sub-image, the processor next calculates what lines go with lines in other sub-images to make up complete lines of text on the document. This is achieved from analysis of the spatial distribution of the lines in each sub-image intermediate data file—clustered distributions indicate part of a complete line of text.

Having identified lines of text associated with each sub-image the processor then applies logical processing operations to the data in the data files in order to stitch together the lines of text to form complete lines.

The strings of characters in the intermediate data files can be stitched together because the processor is able to map the co-ordinates allocated for each character onto a set of global co-ordinates for the whole document. The accurate control of the camera position relative to the document allows this mapping to be performed. In a simple arrangement the processor starts with a "blank" text document and works across the blank document co-ordinate by co-ordinate in a series of horizontal passes covering all the document. For each co-ordinate the processor scans the contents of the processable data files to check if any of the files contains a character at the chosen co-ordinates. If a character is present for those coordinates then a character is written into a blank text document. If no character is reported then a blank or space is allocated to the document. This is then repeated for the next co-ordinate in the scan until the blank document has been filled in.

In most instances where no overlap exists between sub-images only a single character will be identified within the data files for any given coordinate or no character will be present if that part of the document is blank.

In the cases of overlap between sub-images then the processor will find that more than one data file may contain a character that it thinks is present at the chosen co-ordinate. Where all the processable data files report that they have identified the same character at that co-ordinate then no problem exists.

A difficulty arises when, at an area of overlap more than one data file contains a character at the chosen co-ordinate and these characters differ. This can arise for one of several reasons. Firstly, the character may lie only partially within one of the sub-images and so has been incorrectly recognised by the OCR subroutine. Alternatively, it may be distorted if it lies towards the edge of the field of view of an imperfect lens. Again this may lead to incorrect recognition.

If more than one of the processable data files reports a character for a single location in the document co-ordinate frame, a decision is made by the processor as to which is the most reliable. Several different logical processes for selecting which character should be allocated are proposed:

The main rule is that the character which is allocated will be the one which is furthest from the edge of a sub-image. Thus, if two sub-image data files contain characters but one has co-ordinates that correspond to the very edge of the file then that is disregarded and the other is considered to be the most reliable.

Alternatively, the processor may preferentially choose to rely upon a character from a data file which has previously proven the most reliable. For example, if two or more sub-image data files contained conflicting information for the preceding character in a line, the sub-image which was deemed most reliable for the preceding character may again be relied upon.

If two or more sub-images contain different characters for a chosen document location it may be preferred to rely upon a character which forms part of an identified line of text in one of the intermediate data files. This may be preferred as the error could have been caused by an incorrect alignment of sub-images so that characters in different sub-images are shifted so far in adjacent sub-images that the lines of characters can not be correctly matched.

Of course, it is envisaged that many other logical rules may be applied in order to select which character to rely upon.

The process of constructing the output data file is continued for every coordinate until a full text document corresponding to a record of the text on the scanned document has been produced.

In practice, the processor does not need to perform the task of looking for characters at each co-ordinate in the document frame. Because strings of characters corresponding to the lines of text in each sub-frame are first calculated and from finding the average height (Y co-ordinate) of complete lines is calculated it is only necessary to try to extend each line of text into the adjacent lines of the adjacent sub-images. As a choice of which character to rely on need only be made at the edges of the sub-images where lines overlap, the central portions of the line can be quickly and easily stitched into the blank text document without checking adjacent sub-images to see of they contain a character for those co-ordinates.

The final (full) machine readable text document comprises a set of data comprising strings of ASCII characters corresponding to the text content of the document. This is stored in a third area of memory. It can be used by the computer, and used in a word processing package or other software package, as can any other electronic text document.

Figure 3:
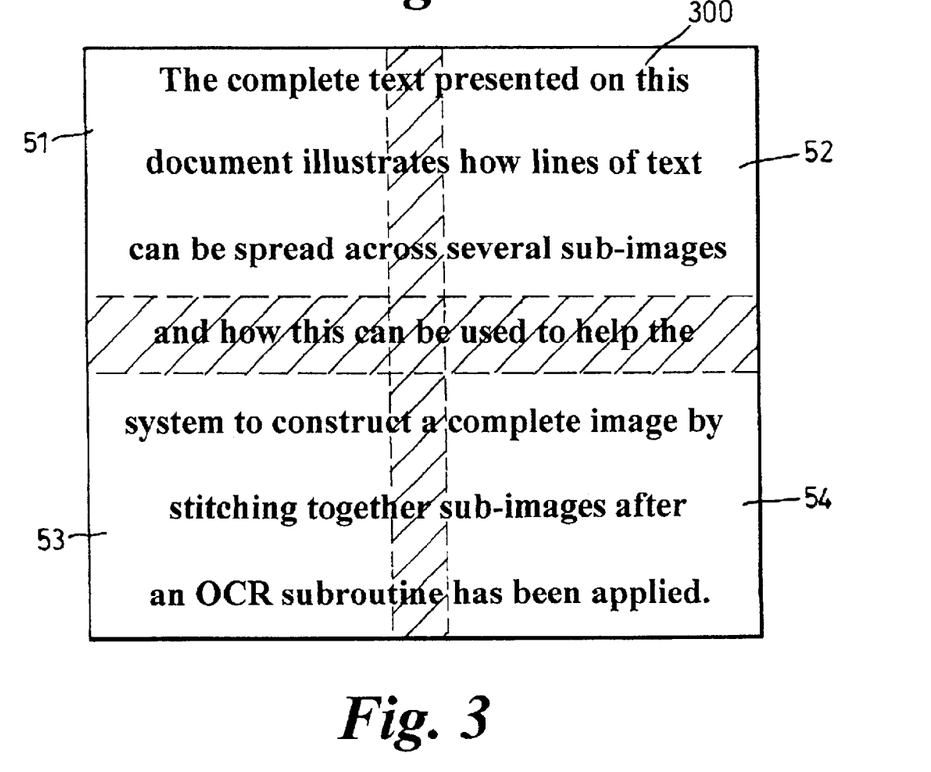
FIG. 3 is a sample image of text on a document that falls within a set of four sub-images.

To better understand how the sub-images are stitched together, consider the production of a machine readable text document equivalent to the simple document 300 shown in FIG. 3. In this example, a portion of a document 300 which falls within four adjacent sub-images is shown. The portion of the document includes seven lines of text as below:

The complete text presented on this
Document illustrates how lines of text
Can be spread across several sub-images
And how this can be used to help the
System to construct a complete image by
Stitching together sub-images after
An OCR subroutine has been applied.

Each of the four sub-images S1,S2,S3,S4 covering the portion of the document covers only four lines of the full set of seven lines of text on the document. It can also been seen that each sub-image only contains half-lines. Importantly, however, each sub-image contains some (at least one) text characters in common with the adjacent sub-images. The characters at the ends of each of the four lines in the two left-hand sub-images are common to the first few characters of the four lines of each of the two right hand images. Also, upper two sub-images share half lines with their adjacent lower sub-images.

Figure 5:
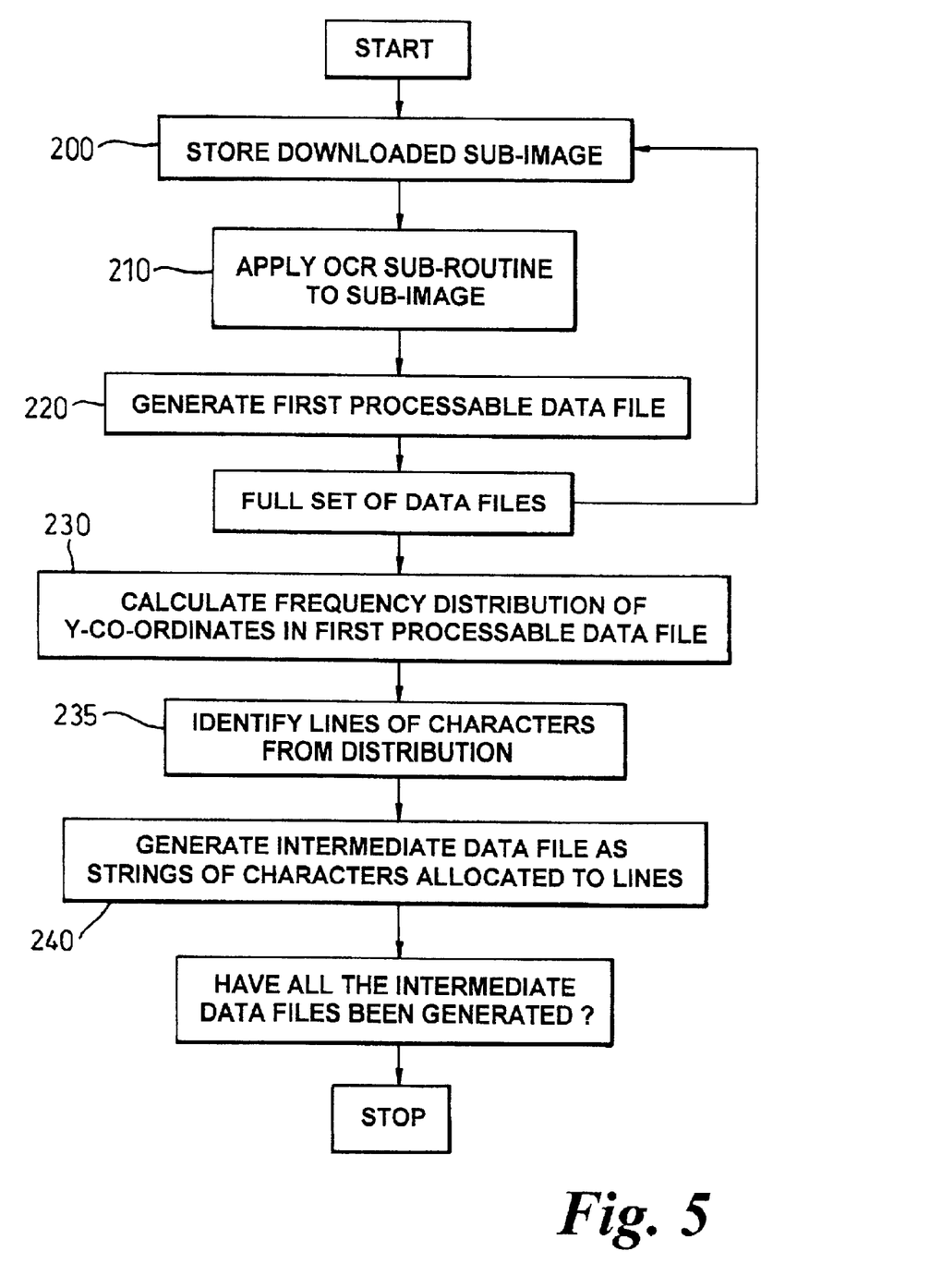
FIG. 5 is a further flow chart of a process for producing processable data-files from the sub-images.

As shown in FIG. 5, the sub-images are initially each passed through the optical character recognition subroutine 210 to produce respective processable first data files 220 in which the characters have been identified along with their location on the document 300. The location is given in terms of a pair of co-ordinates in an x-y frame. The x position is the horizontal position on the document (i.e. looking along the lines of text). The y co-ordinate is the vertical position (i.e. looking down the lines of text). This produces four processable sub-image data files that are stored in memory. The relative location of each file to its adjacent lines is known.

Initially, each first processable data file comprises a set of ASCII data and corresponding reference locations for the boundary box for each character.

In a next step, the processor calculates 230 the frequency distribution of all the characters in the y-plane. Since the characters fall into lines, the results of this for the example will be a grouping of the characters into four distinct sets, with the average y-co-ordinate for each group corresponding to the centre height (y-position) of each line in the sub-image. This distribution of characters 700 can be seen in FIG. 7 of the accompanying drawings. The average height of a line is indicated by a dashed line 701.

Figure 7:
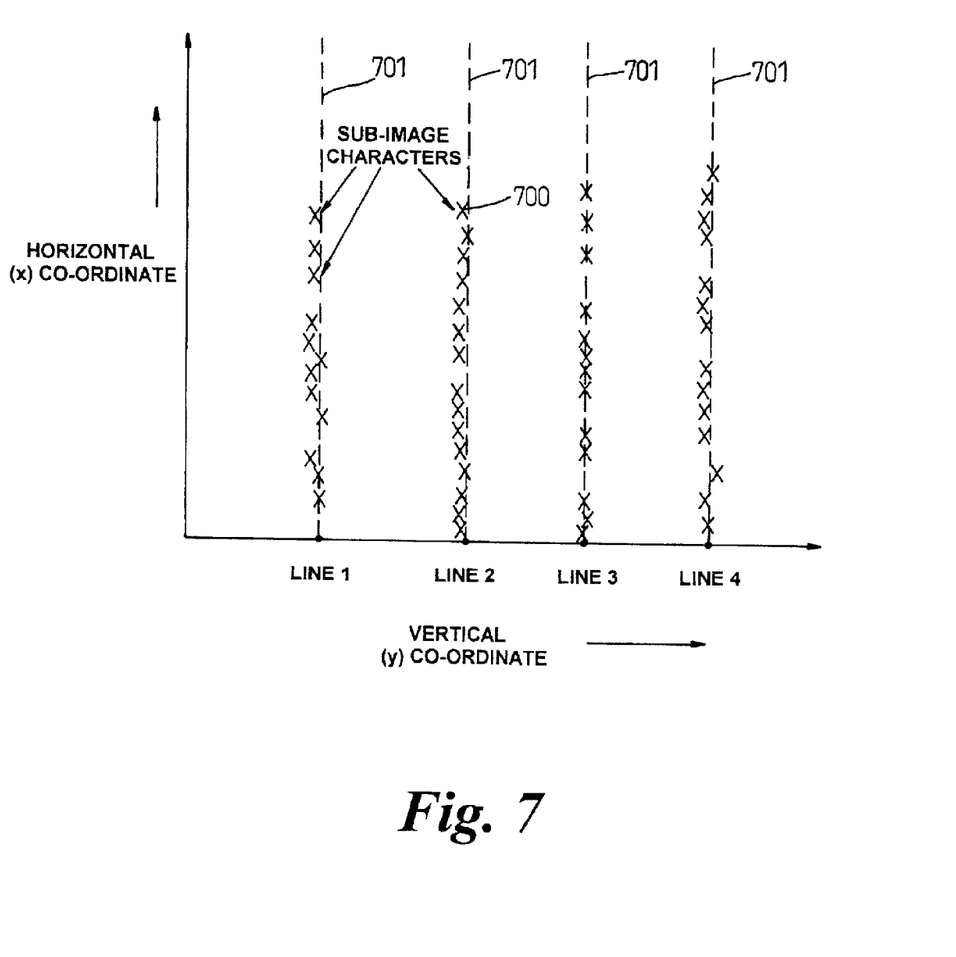
FIG. 7 illustrates the clustering of characters around the Y coordinate indicating lines of text in a single sub-image.

Having identified the location of lines of text 235, the characters are then grouped together into strings of characters. Each string corresponds to a line of text. These strings are stored as four intermediate processable data files. In this example, each intermediate data file will comprise four strings of text corresponding to the four lines present in each sub-image.

Figure 8:
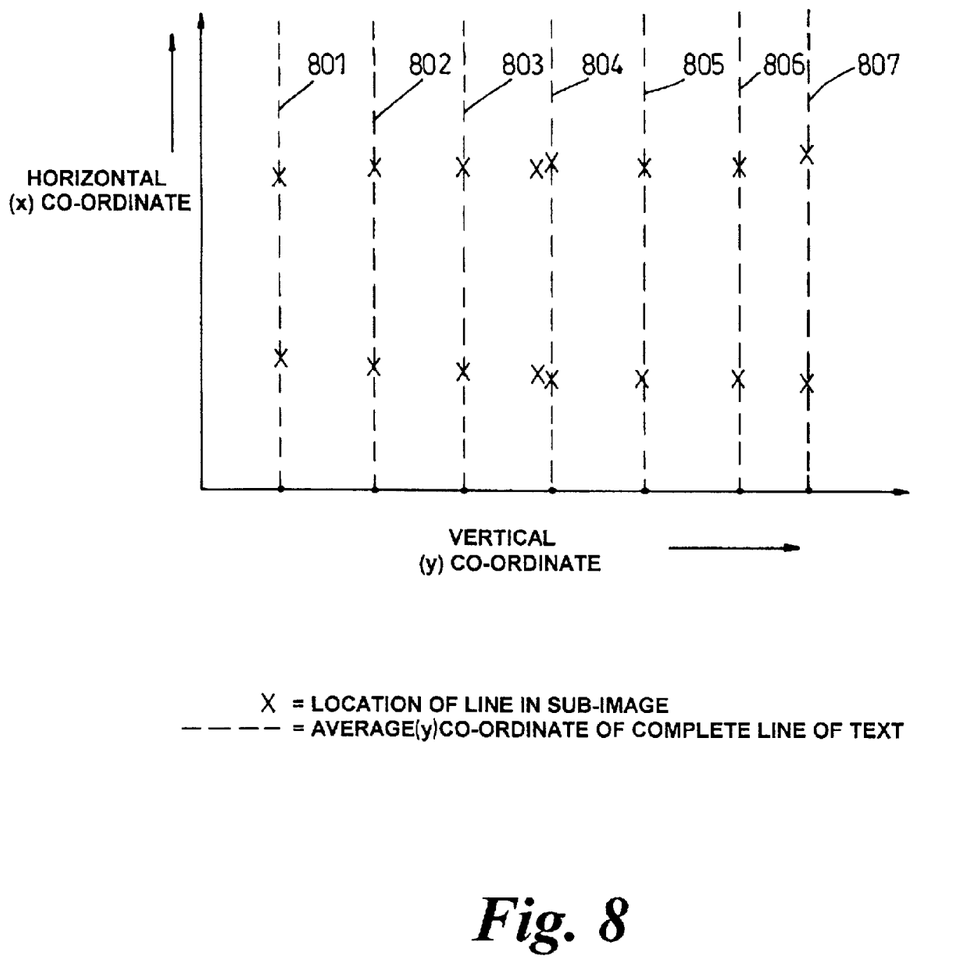
FIG. 8 illustrates the clustering of the lines in each intermediate data file which can be used to identify part or complete lines.

Having identified lines in each sub-image, the lines are then grouped into complete lines of text by comparing the spatial distribution of the line. Those which cluster around a particular vertical co-ordinate can be assumed to be part of a complete text line in the document. In the simple example, the lines in the intermediate data files are clustered in eight groups 801–807 indicating the completed lines. This is shown in FIG. 8.

The average height (i.e. Y co-ordinate) of each complete line is used by the processor when constructing the final text document by stitching the characters. Only characters having Y co-ordinates around those known to be lines need to be stitched in. The remaining co-ordinates in the text document are known to be blank.

Of course, if required, the two steps of identifying lines of sub-images and then identifying lines of complete text could be done in one step by comparing the spatial co-ordinates of all the characters in all the sub-images at once to locate the clusters. The benefit of doing the process in two stages, however, is that line information is often available automatically from many OCR sub-routines.

In an alternative arrangement, the OCR subroutine may automatically produce an output in which characters are grouped into lines of characters. If the output identifies lines but not the y-co-ordinate of the lines, the processor means may calculate a y-co-ordinate for each line by looking at the spatial distribution of the characters on a line. The lines may then be associated with the lines in adjacent subimages as hereinbefore.

In the final stage the four sets of data strings are stitched together to form complete lines. This process is illustrated in the flow chart of FIG. 6 of the accompanying drawings. The processor starts with a "blank" text document into which the data in the processable data files is stitched or pasted. Starting 400 with the intermediate processable data file corresponding to the upper left sub-image S1, the processor works across the x-co-ordinates of the document of the first line of text (its y co-ordinate being known form the frequency distribution). For each co-ordinate the processor looks 410 for characters at that co-ordinate that are held in any of the four intermediate data files. When a character is located it is allocated to that co-ordinate in the blank document. Initially, only the intermediate data file corresponding to the upper left sub-image will report the presence of a character. If none of the data files contain a character at that position a space is inserted into the document.

Figure 6:
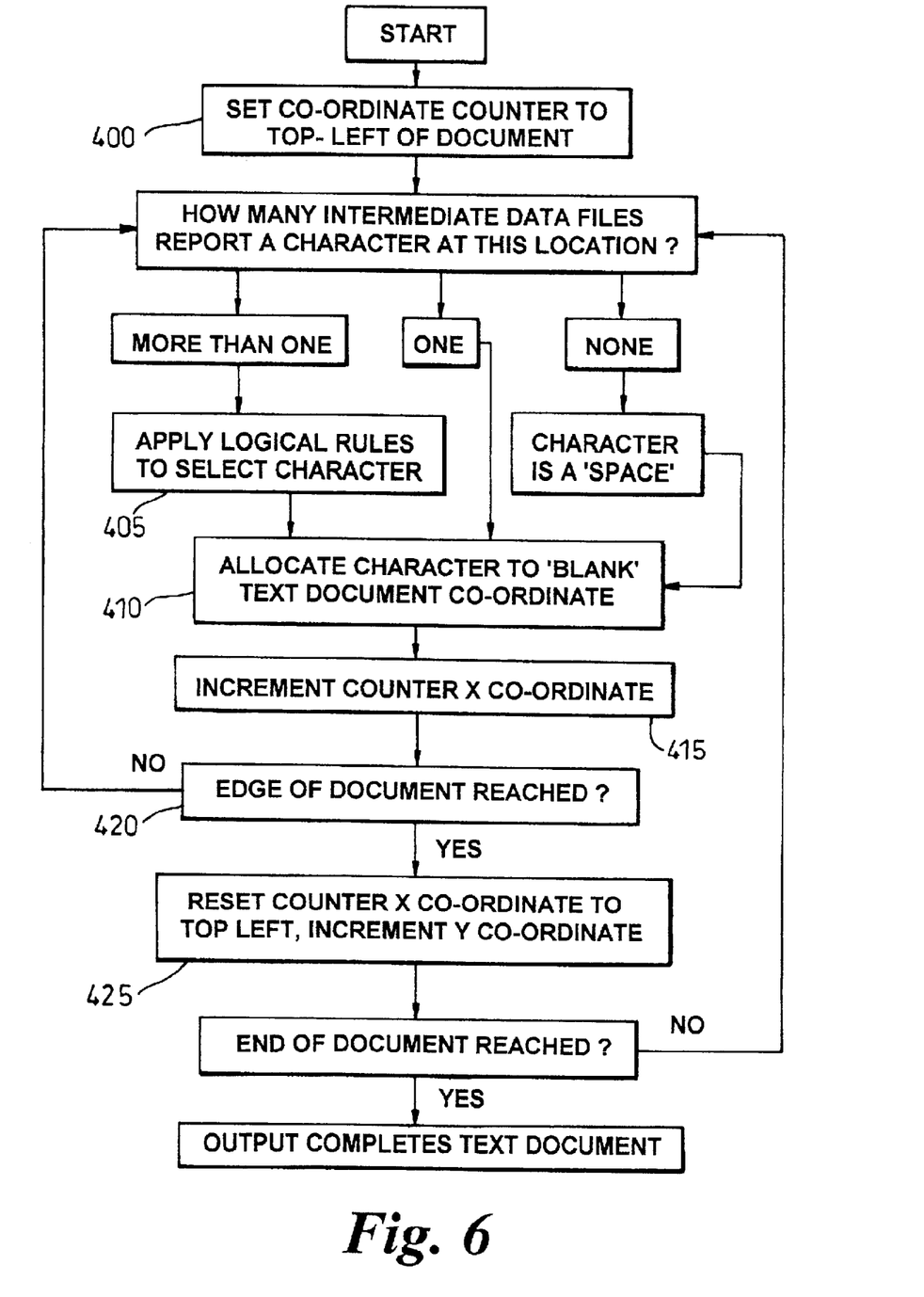
FIG. 6 is a further flow chart of a process of stitching the data in the data files together in a blank text document to produce the final machine readable text document.

The x-co-ordinate is then incremented 415 and the data files checked again for characters. Once the scan along the line reaches co-ordinates in the region of the overlap then two intermediate data files will report the presence of a character. As can be seen clearly, the first such character is the letter "e" of the word "text" on line 1. Assuming perfect character recognition then both will report a letter "e" to be present and this can be allocated to that co-ordinate.

The scan continues from left to right until the processor identifies that the end of the first line on the document is reached 420. The x co-ordinate is then reset 425 to the left side of the document and the y co-ordinate is incremented to move down to the co-ordinate identified for the next line of text. The scan is then repeated for this line until all the strings have been stitched together to produce the full text document.

In the example document of FIG. 3 a problem arises with characters that overlap the edges of a sub-image. An example is the letter "e" of the word "be" on the fourth line. In this case all four intermediate data files will contain a character at that co-ordinate.

Since the character is only partially contained within the upper left and bottom left sub-images it may not have been correctly identified by the OCR subroutine. The processor will then need to decide which data file contains the most reliable data at this co-ordinate by applying the logical rules.

The processor in the above example knows that the character is only partially located within the two left hand sub-images as it will have coordinates corresponding to the very edge of those images. These will therefore be disregarded as being the least accurate.

In order to decide whether to rely upon the data produced from the upper right or the lower right sub-image the processor can look at the reliability of the data contained in those data files for other co-ordinates.

If the processor is still unable to decide which character to use, the control means may move the camera to a location which centres on the problem co-ordinate and one or more further images may then be taken. The further images can then be processed until the processor is satisfied that a reliable choice can be made.

Optionally, the camera may be provided with a zoom lens. This can be used to obtain a single image at relatively low resolution of the whole of the document that is being scanned. By low resolution we mean that an image having significantly fewer dots per inch of the document is obtained. In the example of FIG. 2 where the sub-images form a 4 by 4 grid the zoomed image will have a resolution that is only one sixteenth of that of the sub-images.

The zoomed image is downloaded on to the personal computer along the second ribbon cable and is processed in combination with the sub-image files to help identify the relative location of the various text strings on the document. This can help to improve the speed at which stitching occurs, especially where there is only a limited amount of text on the document. It can be used to help align adjacent sub-images where the adjacent sub-images do not share characters due to gaps in the document. In this manner the identified lines of characters can more accurately be mapped onto the document co-ordinates.

After the complete (full) text document has been generated it is stored in an area of memory for subsequent use by the user. It will be appreciated that an advantage of the present invention in which the stitching occurs only after the optical character recognition has occurred is that it eliminates errors due to the replication of erroneous artefacts between sub-images and considerably improves the rate at which stitching occurs. The system is more powerful in that it allows logical operations to be used to recognise common words or sentence structure between sub-images that can be used to help stitch together the final image. This can not be achieved by simply comparing pixels in adjacent sub-images.

It is envisaged that the invention will be especially useful in producing image files which enable large amounts of paper based information to be stored electronically. This information can be used for archiving, or even word processing applications.

What is claimed is:

1. An electronic image capture apparatus comprising:
   an image detecting device adapted to capture a set of sub-images or tiles corresponding to different areas of a document at known locations and a processor adapted to receive the set of sub-images produced by the image detecting device an to process the sub-images to form a machine-readable text document equivalent to the portion of the document covered by the set of sub-images;

wherein:
   the processor includes an optical character recognition sub-routine which is adapted to produce a first set of processable data files which each comprises a data set of characters corresponding to characters appearing in a respective sub-image in the set and relative location of the characters in that sub-image;
   the processor establishes a co-ordinate system which defines a template of the machine readable document whereby any point in the imaged document can be uniquely identified by co-ordinate of that point in the machine readable text document;
   the processor establishes a second co-ordinate system for each sub-image;
   the processor, after optical character recognition, stores in the processable data files the characters located in each sub-image along with the location of characters in the second co-ordinate system; and
   the processor is adapted to stitch together the characters stored in the data tiles to produce a machine readable text document.

2. An electronic image capture apparatus according to claim 1 wherein the image detecting device comprises an electronic camera having a detector, a lens having a field of view which is adapted to limit radiation incident upon the detector to that within a field of view, an actuator for moving the field of view of the camera relative to the document to be imaged, and a controller for controlling the actuator to move the field of view of the camera across the document so as to capture the set of sub-images or tiles.

3. An electronic imaging apparatus according to claim 1 wherein the data in the first set of processable data files is stitched together to produce the machine readable document by allocating characters in the data files onto corresponding locations in a spatial template of the machine readable document.

4. An electronic imaging apparatus according to claim 1 wherein the first and second co-ordinate systems are the same or are related through a transform whereby each character stored in a processable data file can be mapped onto the co-ordinate frame of the machine readable document.

5. An electronic imaging apparatus according to claim 1 wherein the sub-images overlap spatially at least by a width of the largest character which is expected in the document.

6. An electronic imaging apparatus according to claim 1 wherein where only one data file contains a character at a given location in the machine readable text document the processor is adapted to allocate that character to that location.

7. An electronic imaging apparatus according to claim 6 wherein if none of the processable data files contain a character for a location in the machine-readable text document then a space is entered in the text document at that location.

8. An electronic imaging apparatus according to claim 6 wherein the processor is adapted to determine reliability of the data in the processable data files.

9. An electronic imaging apparatus according to claim 8 wherein in the event that two or more data files contain different characters corresponding to the same location in the machine readable text file the processor is adapted to select which data to allocate based on the reliability of the data.

10. An electronic imaging apparatus according to claim 8 wherein the processor is adapted to determine the reliability of the data by applying one or more logical rules to the data in the processable data files.

11. An electronic imaging apparatus according to claim 10 wherein the logical rules include using the character which is located furthest away from the edge of a sub-image to construct the machine readable document if there is a conflict.

12. An electronic imaging apparatus according to claim 1 wherein the processor is adapted to identify lines of text within each processable data file from a spatial distribution of the characters identified within each sub-image.

13. An electronic imaging apparatus according to claim 1 wherein the data in the processable data files comprises ASCII characters.

* * * * *